April 14, 1970     H. E. REMMERT     3,506,300

TELESCOPING TRAILER

Filed July 22, 1968     2 Sheets-Sheet 1

INVENTOR.
HAROLD E. REMMERT
BY
Richard D. Law
ATTORNEY

April 14, 1970     H. E. REMMERT     3,506,300
TELESCOPING TRAILER

Filed July 22, 1968     2 Sheets-Sheet 2

INVENTOR.
HAROLD E. REMMERT
BY
Richard D. Law
ATTORNEY

United States Patent Office 3,506,300
Patented Apr. 14, 1970

3,506,300
TELESCOPING TRAILER
Harold E. Remmert, Denver, Colo., assignor to Jo Bud, Inc., Denver, Colo., a corporation of Colorado
Filed July 22, 1968, Ser. No. 746,592
Int. Cl. B60p 3/32
U.S. Cl. 296—23                                    8 Claims

ABSTRACT OF THE DISCLOSURE

A telescoping house trailer having an upper section which telescopes over a lower section in retracted position for travel tnd extended position for use, in-cludes a hydraulic cylinder attached to a cable system with cables extending from the cylinder to opposed sides of upper section for uniformly raising and lowering the upper section on the lower section. Sealing means are provided between the upper and lower sections for both extended position and retracted position. Cabinet means internally of the trailer is movable from a position for retracting to an operable position.

---

Telescoping house trailers, both of the camping type and the house type, are well known and several models of both are currently being manufactured and sold, particularly the smaller camping style trailer. One valuable advantage of a telescoping trailer is the low profile to which it telescopes for travel. This, of course, reduces the wind resistance over a conventional, full height house trailer and provides considerably better vision to the rear of the towing vehicle. A number of trailers, which reduce to a lower height than that for use, are collapsing types, having walls that are hinged so that they fold to reduce the height of the ceiling or roof of a trailer. These are awkward to set up and generally leak dust and dirt during travel. Previous telescoping trailers have used a hydraulic cylinder at each corner of the trailer, and an uneven load, as by a tilted trailer, uneven distribution of weight on the roof, or the like causes the cylinders to extend unevenly, cocking the top section of the trailer. Such mechanisms are, also, complicated and expensive and unduly burden the concept of a telescoping trailer. Further, in some instances the previously known telescoping or collapsing structures impose too many limitations on living space in the expanded structure.

Included among the objects and advantages of the present invention is to provide a simple, yet strong telescoping trailer structure using a simple and positive means for evenly extending or retracting the upper section of a two section trailer.

Another object of the invention is to provide a single hydraulic cylinder for uniformly raising and lowering the upper section of a two part trailer.

A further object of the invention is to provide a positive complete dust seal for a telescoping trailer in retracted condition and a weather seal between upper and lower sections of a two section trailer in extended condition.

Still another object of the invention is to provide overhead cabinets in a telescoping or collapsable trailer arranged to be moved from a position for retracting to a usable position over a counter in extended position.

These and other objects and advantages of the invention may be readily ascertained by referring to the following description in which.

The description below is directed to a particular trailer arrangement and it is intended to be applicable to such similar arrangements as occurs to those skilled in the art, particularly as to changes in size and materials.

Figure 1:
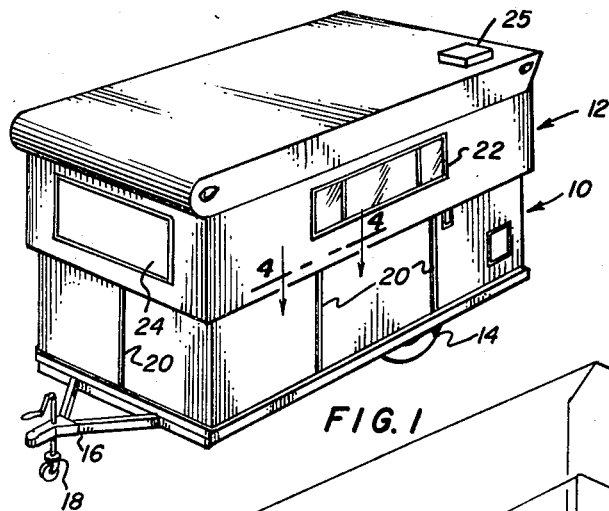
FIG. 1 is a perspective view of a telescoping trailer, according to the invention, in full extended position.

In the device illustrated in FIG. 1, the telescoping house trailer includes a lower section 10 and an upper section 12 reciprocably mounted thereon. The lower section is mounted on a frame having wheels 14, a draw bar 16 and landing wheel 18, all of which may be conventional. The upper section reciprocates on guides 20, detailed below, for smooth travel, and preventing binding of the top section on the lower section. The upper section has conventional windows 22 and 24 (also, windows on the other sides, not shown) and a two part door (not shown) on the end opposite the draw bar. The door has an upper portion mounted in the trailer upper section end a lower portion mounted in the trailer lower section in generally conventional manner. The trailer, also, has a conventional vent 25.

Figure 2:
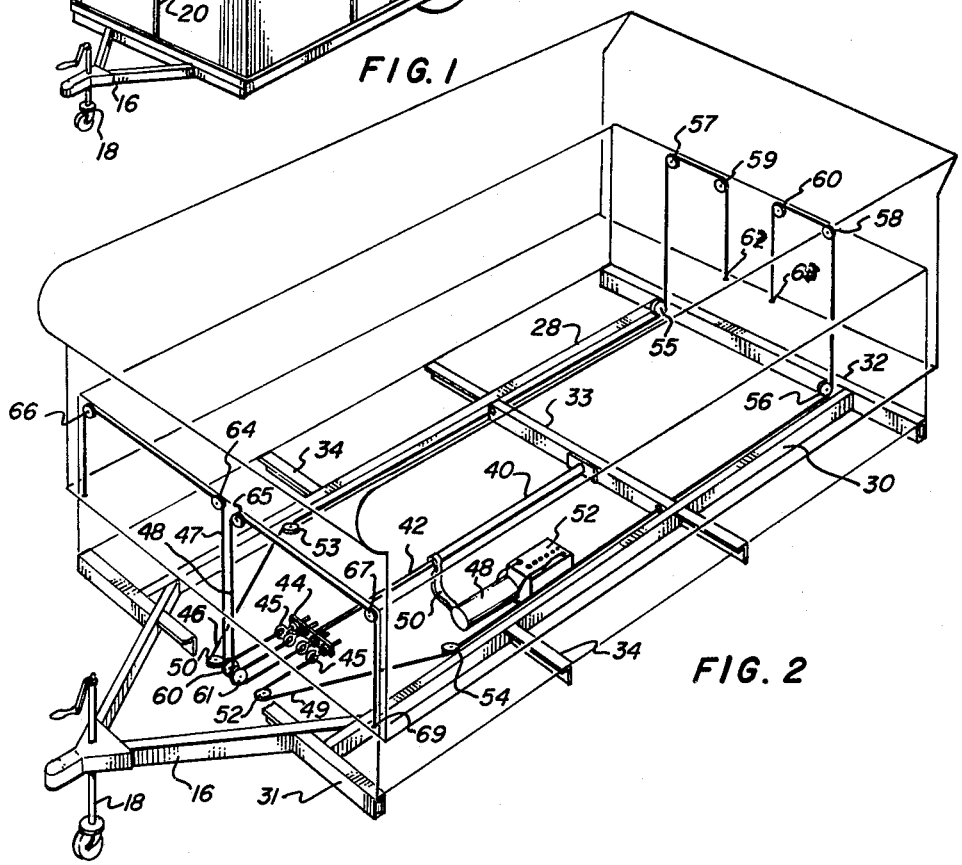
FIG. 2 is a schematic view of the lifting mechanism for a telescoping trailer, according to the invention.

The frame, shown in FIG. 2, includes longerons 28 and 30 with end members 31 and 32. Cross member 33 supports flooring and supports wall structures along with laterals 34 in conventional manner. A hydraulic cylinder 40 with a piston rod 42 is mounted on the frame in suitable manner extending longitudinally of the frame. A cross head 44 is secured to the free end of the piston rod, and a series of eye-bolts 45 are mounted therein with nuts in conventional arrangement to permit adjustment of the length of eye-bolt extending beyond the cross head. A hydraulic pump and reservoir combination 48 has its outlet and inlet lines 50 communicating with the cylinder according conventional practice. An electric motor 52 powers the hydraulic pump. The power leads for the electric motor may be through the electric connection between the towing vehicle and the electric circuit for the trailer lights. In place of the motor and pump, a hand pump and reservoir may be mounted on the draw bar or other convenient location for pumping hydraulic fluid into the cylinder.

Connected to each eye-bolts is the end for each of cables 46, 47, 48 and 49. Cables 46 and 49 pass over horizontally disposed pulleys 50 and 52 respectively, past pulleys 53 and 54 mounted on the longerons respectively to pulleys 55 and 56 respectively and then up to upper pulleys 57 and 58 respectively. The cables then pass to pulleys 59 and 60 respectively. The pulleys 57, 58, 59 and 60 are tube mounted, explained below, adjacent the top of the lower section of the trailer. The ends 62 and 63 of the cables are attached to the bottom of the upper section of the trailer. The two inside cables 47 and 48 pass pulleys 60 and 61 to upper pulleys 64 and 65 respectively and then through a tube to pulleys 66 and 67 respectively. The ends 68 and 69 are secured to the upper section of the trailer.

Figure 3:
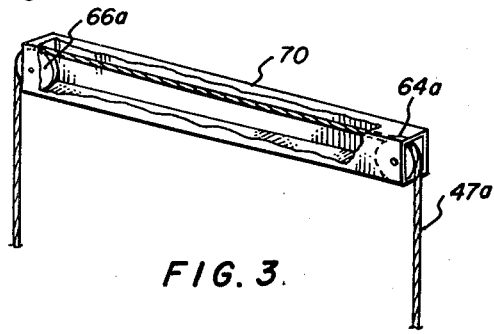
FIG. 3 is an enlarged detail of a cable tube and pulley system for the elevating system of the telescoping trailer.

The tubes for the upper pulleys at both ends of the trailer are rectangular, illustrated in FIG. 3, and include tubular section 70 with a pulley 66a journalled in one end and a pulley 64a journalled in the other end. The cable 47a passes over the pulleys and through the tube. The tubes are connected in an outwardly extending flange on the lower trailer section and the ends of the cables are secured to an inwardly extending flange on the upper trailer section, so that the anchor for the cable is directly below the pulley at the end of the tube.

Actuation of the hydraulic cylinder moves all the cables together so that the ends of the cables, and the attached bottom of the upper section, move conjointly lifting or lowering the upper section uniformly in relation to the lower section of the trailer. In this manner the upper section does not cock and bind on the lower section.

Figure 4:
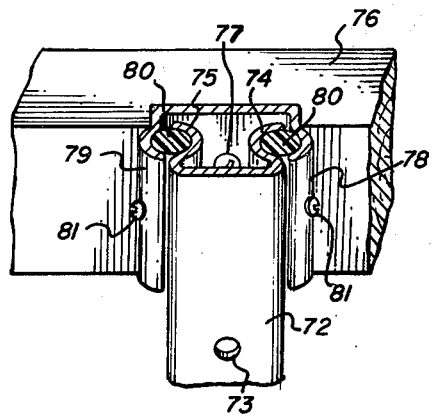
FIG. 4 is an enlarged detail, in cut-away perspective, of guide means between upper and lower sections of a telescoping, sectional trailer.

The guides for the upper section provide smooth movement of the upper section, holding it in correct alignment on the lower section. Each guide includes, FIG. 4, a track 72 which is attached to the lower section, by screws or the like through a series of holes 73 along the track. The track is a U-shaped member with arcuately indented sides 74 and 75. The track runner is usually counter-sunk and attached to a flange 76, which is an inwardly extending flange on the bottom edge of the upper trailer section, and the runner is attached by screws 77 or the like. The runner is, also, U-shaped and includes outwardly arcuate sides 78 and 79 which fit over the sides of the track. A nylon or other plastic cylinder 80 is mounted between the legs of the track and runner, held in place by screws 81. The cylinders are flexible plastic, and against aluminum or similar metal, are self lubricating for free running of the runner in the track.

Figure 5:
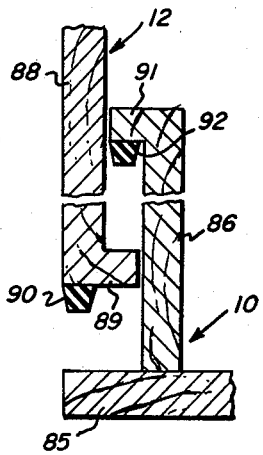
FIG. 5 is a cross-sectional detail one form of seal means between upper and lower telescoping trailer sections.
Figure 6:
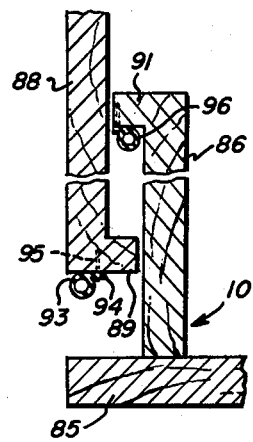
FIG. 6 is a cross-sectional detail of a modified form of seal means between upper and lower telescoping trailer sections.

The upper section is constructed with a flange which extends inwardly around the bottom edge thereof, and a seal mounted on this flange seals against the lower section for a tight dust seal when the trailer is in travel position. As shown in FIG. 5, the lower section 10 is provided with an extending flange 85 outside a side wall 86. This may be an extension of the floor mounted on the frame or an added flange. This flange extends completely around the lower section in the same plane. The upper section has side wall 88 which telescopes over side wall 86 of the lower section, and an inwardly directed flange 89 extends around the upper section in the same plane. The flange 89 seats on the flange 85 when the trailer is in down position, and a soft, resilient gasket 90 attached to the flange 89 and extending completely around the trailer, except for the door area, forms a positive seal when the upper trailer section is retracted on the base. In upper or extended position, the flange 89 mates with a flange 91 extending outwardly from the wall 86 of the lower trailer section. This flange 91 extends around the lower section in the same plane parallel to flange 85 so as to mate with flange 89. A soft, resilient gasket 92 mounted on the flange 91 seals on flange 89 forming a positive seal when the upper section is fully extended. The gaskets are preferably made of foamed rubber, plastic or similar soft, resilient strips for forming a tight seal. This may be attached by cement, nails, staples or the like. A modified form of gasket is shown in FIG. 6, where a tubular gasket 93 with a flange 94 is secured to the flange 89 by nails 95 or the like. The tubular gasket may be made of resilient material such as rubber, plastic etc., soft enough to deform and seal between the two flanges. A similar gasket 96 is attached to flange 91.

Figure 7:
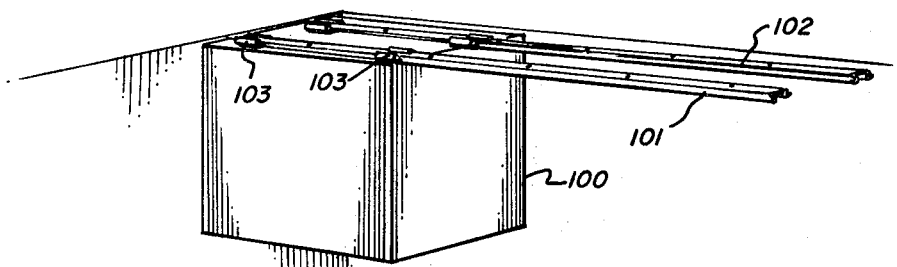
FIG. 7 is perspective detail of an overhead cabinet assembly with its mounting for movement.
Figure 8:
FIG. 8 is a schematic, side elevation, in cross-section, of a cabinet arrangement for telescoping trailers.

Various fixtures are desirable in a trailer made for living, and one useful fixture is a sink and counter. Most trailers have such a fixture. Another useful fixture is an over-the-counter cabinet. Telescoping trailers have not heretofore had over-counter cabinets. As illustrated in FIGS. 6 and 7, an over-the-counter cabinet 100 is mounted on tracks 101 and 102, attached to the ceiling of the trailer, by means runners 103 which are attached to the top of the cabinet 100. The tracks extend from over the counter to over the center aisle. For telescoping the upper section onto the lower section of the trailer, the cabinet 100 is slid over toward the center of the trailer, FIG. 7, above the aisle between counter 104 and counter 105 on the opposite side. The upper section may then be lowered so that the cabinet lowers into the aisle. Several such cabinets may be used in the trailer, extending from either side and movable to an aisle position.

The cylinder for raising the trailer top is preferably a double acting cylinder with the piston rod extended when the trailer top is in the down position. Hydraulic fluid is injected on top of the piston to retract the piston rod, pulling up the cables and raising the trailer top. A relief valve may be installed in the system to prevent damage when the trailer upper section is fully extended.

The trailer illustrated includes rear cables on each side of the door of the trailer, however, it may be preferable to place the ends of the cables at the corners, thus having four cables—one at each corner. When a larger trailer is used, and a side door is desired, an extra cable mounted on pulleys may be fastened to the side of the trailer to stabilize the raising and lowering.

Several other items are useful for a telescoping trailer, such as a closet-type cabinet, which is taller than the side wall of the lower section, hinged to floor along its front bottom edge so that it lays down for retracted trailer position, or telescoping closets may be used. Pullout tables or benches from the counters or storage areas aid the compactness of such trailers. The cylinder is shown extending longitudinally of the frame, but it may obviously extend laterally thereof.

While the invention has been illustrated by reference to particular embodiments, there is no intent to limit the spirit or scope of the invention to the precise details so set forth except as defined in the following claims.

I claim:

1. A telescoping wheeled trailer having an upper section arranged to telescope on a lower section into a low profile configuration, and extend to a usable extended configuration from the lower section mounted on a frame, the improvement of extending and retracting means for reciprocating said upper section on said lower section including a frame mounted horizontally disposed hydraulic cylinder having a piston rod; at least four cables secured by one end to said piston rod; each said cable extending away from said piston rod in linear alignment thereto to a position adjacent a first side of said frame; pulley means for a first two of said cables at said first side arranged to pass said cables from said alignment up adjacent the top of said lower section and to opposed corners thereon; pulley means at said first side for the second two of said cables for passing the same from said first side to the opposite side of said frame at spaced apart positions and pass said second two cables from said frame adjacent the top of said lower section; said first two cables being secured adjacent to the bottom of said upper section at spaced apart positions and said second two cables being secured adjacent the bottom of said upper section on the side opposite said first two cables and at spaced apart positions whereby retraction or extensions of said piston rod in said cylinder moves all said cables uniformly to uniformly raise and lower said upper section; and means for actuating said cylinder for extension and retraction of said piston rod.

2. A telecsoping wheeled trailer according to claim 1 wherein said cylinder extends longitudinally of said frame and said pulley means at said first side are at the front thereof.

3. A telescoping wheeled trailer according to claim 1 wherein said upper section has an inwardly directed flange at the bottom edge thereof and said lower section has an outwardly directed flange at the top thereof in position to mate with said flange on said upper section, and gasket means on one said flange seals against the other said flange when said trailer is in extended position.

4. A telescoping trailer according to claim 3 wherein said gasket is a soft, resilient strip.

5. A telescoping trailer according to claim 4 wherein said gasket is a tubular member having a flange for attachment to a flange on said trailer.

6. A telescoping trailer according to claim 1 wherein said lower section has an outwardly directed flange from the side wall thereof in position to mate with the bottom edge of said upper section, and gasket means on the bottom edge of said upper section for sealing said upper section to said lower section in retracted position.

7. A telescoping trailer according to claim 1 wherein an electric motor actuates a hydraulic supply for said pump.

8. A cabinet for a telescoping trailer having a covered upper section telescopically mounted on a lower section and a counter mounted internally of said trailer, comprising a hollow container having a door; track means attached to the inside of said cover extending from a side of said upper section to about the middle thereof; and runner means attached to top of said container and reciprocably mounted on said tracks.

References Cited

UNITED STATES PATENTS

| | | | |
|---|---|---|---|
| 3,363,932 | 1/1968 | Mann | 296—26 |
| 2,055,930 | 9/1936 | Josephs | 296—23 |
| 2,193,352 | 3/1940 | Thomas | 296—23 |
| 3,321,233 | 5/1967 | Davis | 296—23 |
| 2,984,515 | 5/1961 | Hocks | 296—23 |

PHILIP GOODMAN, Primary Examiner

U.S. Cl. X.R.

296—27; 52—66